United States Patent
Guthrie et al.

(10) Patent No.: US 6,467,686 B1
(45) Date of Patent: Oct. 22, 2002

(54) SYSTEM AND METHOD FOR ELECTRONICALLY MANAGING AND REDEEMING COUPONS

(76) Inventors: Andrè Guthrie, 3330 Country Square Dr. #203, Carrollton, TX (US) 75006; Mark Silva, 3266 Birch Ave., Grapevine, TX (US) 76051; Allen Swofford, 1248 Red Deer Rd. East, Cleburne, TX (US) 76031

( * ) Notice: Subject to any disclaimer, the term of this patent is extended or adjusted under 35 U.S.C. 154(b) by 0 days.

(21) Appl. No.: 09/569,653

(22) Filed: May 12, 2000

Related U.S. Application Data (60) Provisional application No. 60/133,711, filed on May 12, 1999.

(51) Int. Cl.$^7$ ................................................ G06K 15/00
(52) U.S. Cl. ..................... 235/383; 235/375; 235/462.01
(58) Field of Search ................................ 235/383, 381, 235/375, 462.01, 462.45, 472.01; 705/14, 16, 17, 20

(56) References Cited

U.S. PATENT DOCUMENTS

| | | | | |
|---|---|---|---|---|
| 5,424,524 A | * | 6/1995 | Ruppert et al. | 235/383 |
| 5,905,246 A | * | 5/1999 | Fajkowski | 235/375 |
| 6,129,274 A | * | 10/2000 | Suzuki | 235/381 |
| 6,129,276 A | * | 10/2000 | Jelen et al. | 235/383 |
| RE37,166 E | * | 5/2001 | Rando et al. | 235/462.36 |

* cited by examiner

Primary Examiner—Michael G. Lee
Assistant Examiner—Daniel St.Cyr
(74) Attorney, Agent, or Firm—Bracewell & Patterson, L.L.P.

(57) ABSTRACT

A system and method for managing the coupon redemption process electronically. A hand held device is used to store electronic coupons, which is then taken to retail stores for redemption of the electronic coupons during check-out. At check-out, the device downloads the electronic coupon data and the data is stored in the retail store's computer. The data from the retail store's computer is uploaded into coupon clearinghouse computer to enable retail stores to obtain redemption of the rebates owed to it from the manufacturers. The manufacturers can track coupons better and collect spending data about consumers. The method and device automates and improves coupon redemption process.

22 Claims, 4 Drawing Sheets

SYSTEM AND METHOD FOR ELECTRONICALLY MANAGING AND REDEEMING COUPONS

This application claims benefit of Provisional Application. No. 60/133,711 filed May 12, 1999.

BACKGROUND OF THE INVENTION

1. Technical Field

This invention relates to a coupon management system. In particular, the invention relates to a method of crediting coupons to a consumer, utilizing an electronic reader for reading scannable data and comparing the scannable data with a database of purchased products for crediting the coupons against the total price of the purchased products.

2 Description of the Related Art

The world of product marketing is highly intense and competitive, with the understood intent to increase the gross sales of a given product. Among the many calculated strategies manufacturers utilize to this end is the dissemination of "cents-off" coupons. In the marketplace, the coupon has become a popular means of advertising a product. The coupon is used to stimulate consumers to purchase products by providing the consumer with a financial benefit, creating product awareness, prompting product trials, and rewarding repeat product purchases. This technique benefits all parties concerned, the manufacturer, the retailer, and the consumer. The manufacturer gains as his product is publicized and the coupon, upon redemption, provides a means for tracking customer tastes and reactions. Information can be correlated with other marketing data to develop a customer profile for intelligent analysis of product promotions. The retailer is happy as consumers comb his store in search of the item being discounted. And, of course, the thrifty consumer is the most eager of all as he saves some money at the check out. The coupon itself has many inherent benefits.

The most common form of a coupon is the retail, paper product coupon. Each coupon has printed thereon an alphanumeric identification. The alphanumeric identification, or coupon code, has no inherent information. A database must be utilized to get any desired information from the code. The information available is the manufacture and family of a particular item, a description and an amount by which to decrease the retail price of the item, an expiration date, and other useful codes that identifies the coupon. On January 1997 the coupon code was extended by the Uniform Code Council, Inc.(UCC). The extension enables manufacturers to put more information into coupon codes such as special offer codes and household or area ID codes. Currently, there are three coupon code databases one can access for a small fee.

While many customers are inclined to utilize coupons, the process of clipping and saving these coupons tends to be time-consuming and cumbersome. The process begins when the manufacturer decides to print and distribute coupons for one of its products. Consumers receive these coupons through a variety of means, with the most prevalent being the Free Standing Insert (FSIs). The use of the paper coupon requires the consumer to sit down each week, examine coupon FSIs, and cut out the coupons they want to use. Even when not required to cut coupons, some consumers consider coupons too much trouble to constantly organize and carry about. While many companies sell coupon organizers, coupon categorizers and coupon alphabetizers, these methods still require coupon clipping, constant coupon organization, and maintenance (removing expired coupons). It should be no surprise that the vast majority of coupons in FSIs each week go unredeemed.

Even after the consumer reaches the supermarket with his coupons, there are further problems with the present paper-based system. The most common system of redeeming coupons requires a paper coupon to be presented to a cashier when the consumer is checking out. The check-out clerk, to whom a coupon is presented, manually looks over the coupon. This not only wastes precious check-out line time as the clerk must carefully look over the coupon, but also reduces accuracy of the operation. Examples of potential error may include overlooking an expiration date, or overlooking the exact product specification for which the coupon is valid, i.e. only a certain size package may be stipulated on the coupon. Then, the cashier scans the coupon bar code with a scanner associated with the cash register and the cash register software identifies whether the coupon corresponds to an item just purchased. Also, when the consumer has numerous coupons, the individual examination and scanning of each coupon can be very time consuming, delaying all other consumers waiting in line.

This delay is greatly exacerbated when the cash register indicates that no corresponding product has been purchased for one or more of the coupons, stopping the transaction. To discover why a coupon is not appropriate, the cashier must examine the coupon and then review the cash register receipt to determine what aspect of the purchased product does not meet the coupon redemption requirements. In the case where the cashier desires to accept the inappropriate coupon as a customer service gesture, the cashier must "override" the cash register's rejection of the coupon. Typically this requires the pressing of several additional keys on the cash register. When this entire process must be repeated for multiple coupons not accepted by the cash register, which is common in the majority of transactions in which coupons are used, the delay disrupts the entire checkout process and negatively affects transaction speed, customer service, and front-end productivity.

Further problems and inefficiencies in the coupon redemption process arise after the retailer has accepted the coupons from consumers. In order for the retailer to be reimbursed by the manufacturer, the retailer must determine the total value of each manufacturer's coupons the retailer has redeemed. Due to the large volume and diversification of coupons handled by most merchants and the large number of manufacturers, it is often more efficient to employ a third-party coupon processing service or clearinghouse.

At the clearinghouse, the coupons are received from many retailers, pertaining to a multitude of manufacturers. An operator at the coupon processing service will manually handle each coupon, scan or manually enter the U.P.C. code, and sort the coupons by manufacturer. Typically, the sorting and counting work is done out of the country, where it may be done more economically. Then, the results are returned to the U.S. for billing the manufacturer and crediting the retailers. Sometimes the manufacturer may again sort the coupons using its own employees or another clearinghouse to insure all the coupons are the manufacturer's and check for signs of fraud. This process is fairly labor and time intensive.

The process is completed for every one of the billions of coupons redeemed annually. By the time the coupons have been collected by the retailer, passed through one and possibly two clearinghouses, and the manufacture reimburses the retailer, several weeks or months may have passed. The result is a considerable disadvantage to the retailer since the time between when the retailer gives the consumer the coupon discount and when the manufacturer reimburses the retailer is, in effect, an interest-free loan to the manufacturer. As would be expected, this very loose loop inevitably results in the retailers claiming they are under-credited, and the manufacturers claiming over-billing.

The manufacturer also suffers from the slow redemption process. The manufacturer cannot determine the effect of a coupon promotion until the manufacturer receives information on the number of coupons redeemed. Therefore, due to the current time intensive process, it is impossible for a manufacturer to quickly react to product performance, coupon redemption rates, or market changes.

In addition to the legitimate redeeming process being cumbersome, the conventional system is subject to abuse. Unfortunately, because redemption coupons frequently have a cash redemption, there exists wide spread problems with fraudulent misredemption and malredemption. Misredemption occurs where a retailer accepts a coupon for a product that has not been purchased. The situation may arise where retailer personnel may accept large numbers of coupons that are not closely related to the products bought by the consumer. In such a case, the manufacturer eventually (whether initially or through an invoice reduction by the retailer following a manufacturer's refusal to pay) reimburses the retailer while receiving no corresponding benefit in sales. Some misredemption occurs internally by retail employees, and is fought by the retailer. In other cases, the retailer is intentionally involved in misredemption to increase profits. Misredemption can run into the double digits for retailers, and manufacturers are plagued with the costs of paying for and preventing it.

Malredemption is another type of coupon fraud often practiced. Malredemption is the large scale submission of redemption coupons directly to the manufacturer for reimbursement of the coupons without the product having ever been purchased. Typically malredemption is carried out by illegitimate retailers acting as a "front" for persons who have set up mass coupon clipping systems. Because of the difficulty in correlating the number of available redemption coupons with the specialty items sold, the conventional system is subject to manipulation. Together misredemption and malredemption cost manufacturers hundreds of millions of dollars annually. Fraud prevention by manufacturers requires large financial resources for the staffing of coupon fraud reduction departments.

It is not suggested that coupons should be eliminated but the current process must be changed. It is widely considered to be inefficient and is an easy victim of redemption fraud. Manufacturers print and distribute billions of paper coupons a year, and the redemption rate is very low. Also, manufacturers must spend hundreds of millions each year just to combat redemption fraud. Due to the tedious nature of the current process, it is suggested that a different system should be developed in which discounts can be applied to various products in a more economical and efficacious process. The industry needs to find a way to make the system more efficient, and to improve low redemption rates. The industry also needs to alleviate the cumbersome redemption process as well as reduce security and fraud problems.

Recently, a number of systems have been developed which address the problem of coupon redemption. One type of system is an electronic in-store coupon issuing and redeeming system that avoids the necessity of printing and collecting paper coupons. However, inventions such as this are limited only to the store they are located in. The user cannot organize the coupons at home or plan a shopping trip based on available coupons. In addition, the user will not know what is on sale until they get to the store. Also, inventions such as these do not utilize FSIs and require the customer to still clip, and organize other coupons. These types of inventions fail because they do not take advantage of currently available coupons.

Another type of invention utilizes a scanner device to allow a user to scan product bar code information from current coupons into a scanner device. This enables the user to take advantage of currently available FSI coupons as well as organize all the coupons the user has scanned. However, these devices have failed because they do not recognize the coupon UPC code or coupon code has no inherent information in itself. A coupon code has the manufacturer id, family code, value code and other such codes. These codes have no inherent information and must be referenced to a database in order for more user friendly information to be obtained.

Some inventions of this nature failed simply because the coupon code is never processed. The scanned information is never compared to a database. Consequently, the user is never provided with any feedback as to the nature of the information stored in the scanner device. Further, there is no way of looking through the stored information to determine which coupon items have been scanned into the scanner device.

Other inventions purport to have the database stored in the scanner and the necessary information is obtained from the database in the scanner. The problem with such an invention is the limited storage capacity of the scanner and the extremely large, almost always dynamic, database of coupon codes. Such inventions do not provide for a feasible way to update the database. Further, most of the previous inventions failed to take any kind of fraud prevention measures. In addition, on January of 1997, a new extended UPC code was introduced. So far, no coupon system has been introduced to take advantage of the new extended UPC code.

There is, therefore, a need for a personal data collector device which allows a user to enter product code information from coupons into a memory device, and receive feedback about the nature of the information stored in the memory device. There is also a need for such a device to provide a user with the ability to interactively manage the list of items stored in the memory device.

It would be extremely desirable to a product manufacturer, if a redemption coupon presented to a potential purchaser was directly correlated with the purchase of an item that is the subject of the coupon. Such a system would help eliminate the potential for abuse and permit redemption of only those coupons that are actually exercised by a consumer. Also, a system which effectively combines the capability of scanning coupons with means for receiving, marking and retaining such coupons so that they cannot be further used would provide important advantages in facilitating the handling of such coupons, regardless of whether they are returned directly to a manufacturer or issuer, or whether they are sent to a coupon redemption center. Additionally, an electronic system that provides both for the display of the electronic coupon and the electronic issuance and redemption of such coupon can wholly avoid the necessity for printing and publishing coupons in material form and the attendant expense of such printing and distribution.

SUMMARY OF THE INVENTION

In order to meet one or more of the identified objects, the present invention includes a method and system for electronically managing and redeeming coupons. The system includes a coupon scanner that a consumer will obtain. The consumer will connect the coupon scanner to a cradle, which will upload coupon information via the Internet or similar data connection highway from a server that contains the coupon information. During this process, the coupon information is marked with a unique personal identifier that will electronically stamp the coupon information with the personal information about the consumer. This will allow every coupon redeemed to be traced from its origin through its redemption. Once the consumer has uploaded the coupon scanner with the desired coupon information, the Consumer takes the coupon scanner to a retail store and redeems the electronic coupons at check-out through a point of sale cradle, which is located at the check-out stand of the retail store.

The point of sale cradle will upload the electronic coupon information and personal information about the coupon scanner owner. The retail store has a server that stores the data received from the point of sale cradle. At a regularly scheduled interval, the retail store can upload its coupon data to a centralized coupon clearinghouse in order to redeem its coupons from the product manufacturers that issued the coupons. The data can also be used by a parent store to determine how much money particular manufacturers owe its chain of stores.

The coupon scanner will contain routines to make the use of coupons much easier for the consumer. One such routine computes the consumer's cost savings based upon coupons used at various intervals, such as monthly or annually. Another routine allows consumers to scan items at home or at the supermarket and search for coupons for that particular product. Yet another routine allows the user to view all coupon records stored in the coupon scanner with a selected letter of the alphabet. This enables consumers to find coupons much easier based upon the manufacturer or the brand names. Other routines are available for the coupon scanner and will be described in greater detail below.

The method and system of the present invention as well as other features, advantages, benefits and objects thereof over other methods and systems known in the art may be better understood with reference to the detailed description which follows.

BRIEF DESCRIPTION OF THE DRAWINGS

FIG. 2 is an elevational front view of a portable scanning and display device.

FIG. 3 is a top view of the scanning and display device in FIG. 2.

FIG. 4 is a bottom view of the scanning and display device of FIG. 2.

5A is a left side view of the scanning and display device of FIG. 2.

FIG. 5B is a right side view of the scanning and display device of FIG. 2.

FIG. 6 is a side view of a docking station for receiving the scanning and display device of FIG. 2.

FIG. 7 is a front elevational view of the docking station for the scanning and display device of FIG. 2.

DETAILED DESCRIPTION OF THE INVENTION

Figure 1:
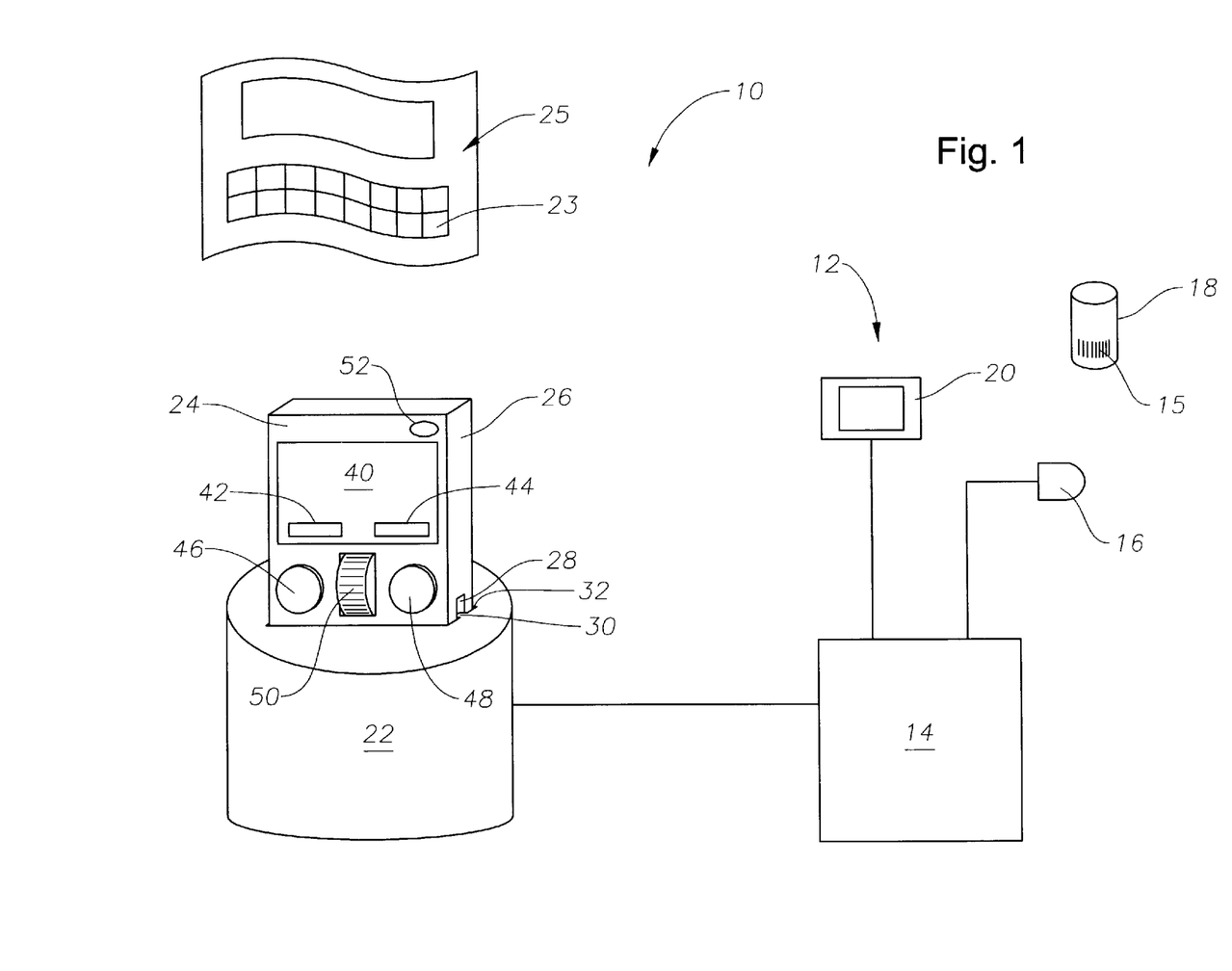
FIG. 1 is a schematic diagram of the coupon management system of the invention.

Referring now to FIG. 1, shown is a schematic diagram of the coupon management system 10 of the invention. A pricing system 12 is shown, which consists of a computing device 14, and a scanner 16, which is provided to scan scannable pricing information 15 off of purchased products 18. The scanned information is transmitted to a computing device 14, and is displayed on display 20. An operator uses scanning and display device 24 to scan scannable information 23 off of coupon 25. Preferably, the scannable information is presented as a bar code. The scanning and display device 24 is used to scan and store the information in a manner known in the art. A docking station 22 is connected to a computing device 14 for uploading coupon information from a scanning and display device 24.

Figures 2, 3, 4, 5A, 5B, 6, 7:
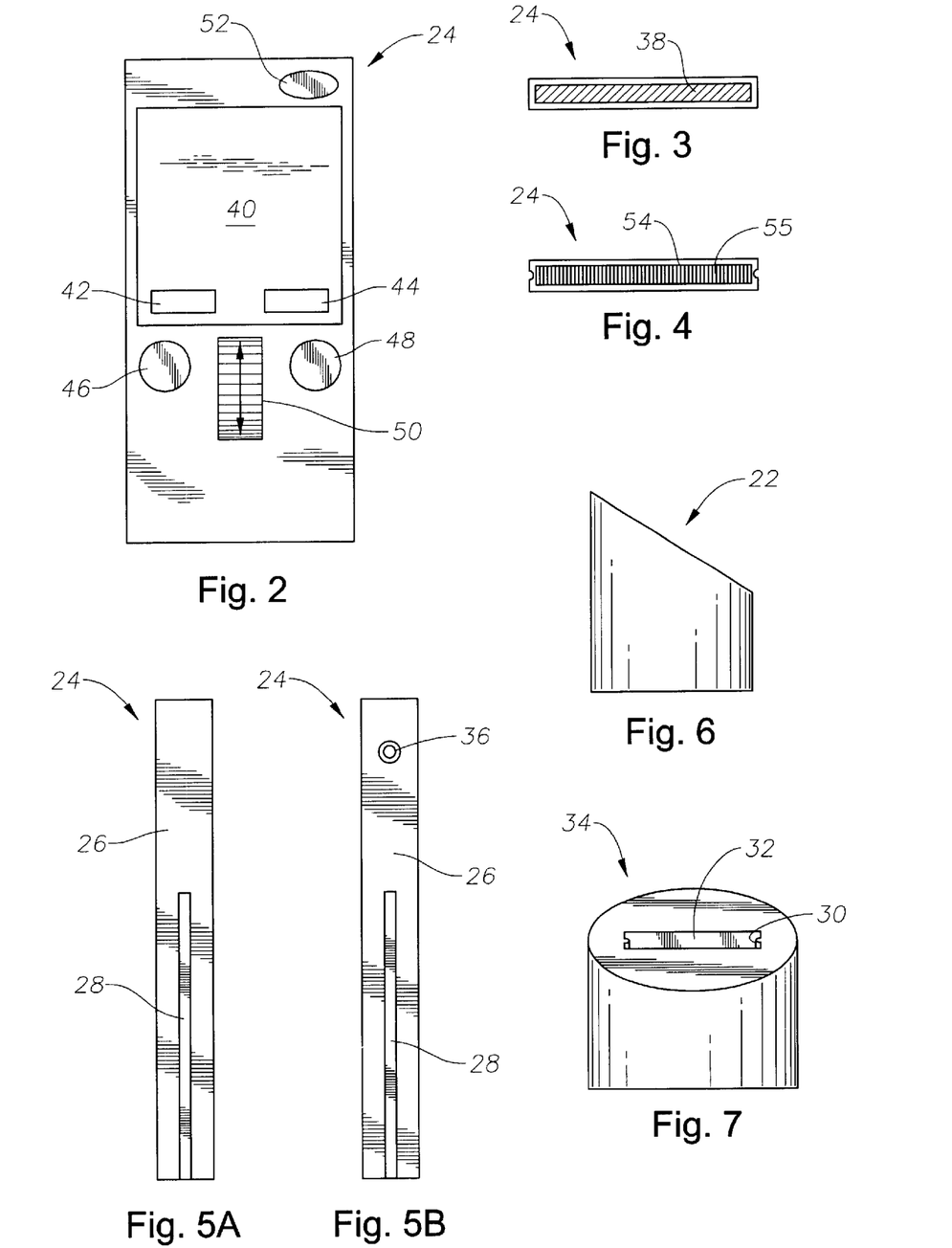

Referring now to FIGS. 2–7, a scanning and display device 24 has a housing 26 having a guide slot 28 (FIGS. 1, 5A and 5B) for engagement with a ridge 30 within a receiving slot 32 of docking station 34 (FIGS. 1, 6 and 7). The scanning and display device 24 is preferably battery operated. A charging port 36 is provided on a side of housing 26 so that the battery may be charged. A scanner face 38 (FIG. 3) is provided on a top surface of scanning and display device 24. Scanner face 38 enables an operator to scan scannable coupon information into memory of the scanning and display device 24. A display screen 40 is provided to display information regarding the information scanned from coupons. In the preferred embodiment, a designated location 42 will be provided to display the date and time and a designated location 44 is provided to display coupon expiration dates. To operate the scanning and display device 24, an insert button 46 is provided to enter data and a delete button 48 is provided to delete selected data from memory of the scanning and display device 24. A scroll button 50 is preferably provided so that an operator may scroll through a list of coupon information. An on/off switch 52 is also provided to activate or deactivate the device. Finally, on a bottom surface a data output 54 is provided for operative engagement with a data input (not shown) at the bottom of receiving slot 32. Preferably, data output 54 is comprised of a multiplicity of metallic contacts 55 (FIG. 4) for cooperative engagement with a multiplicity of metallic contacts within receiving slot 32 (not shown).

Figure 8:
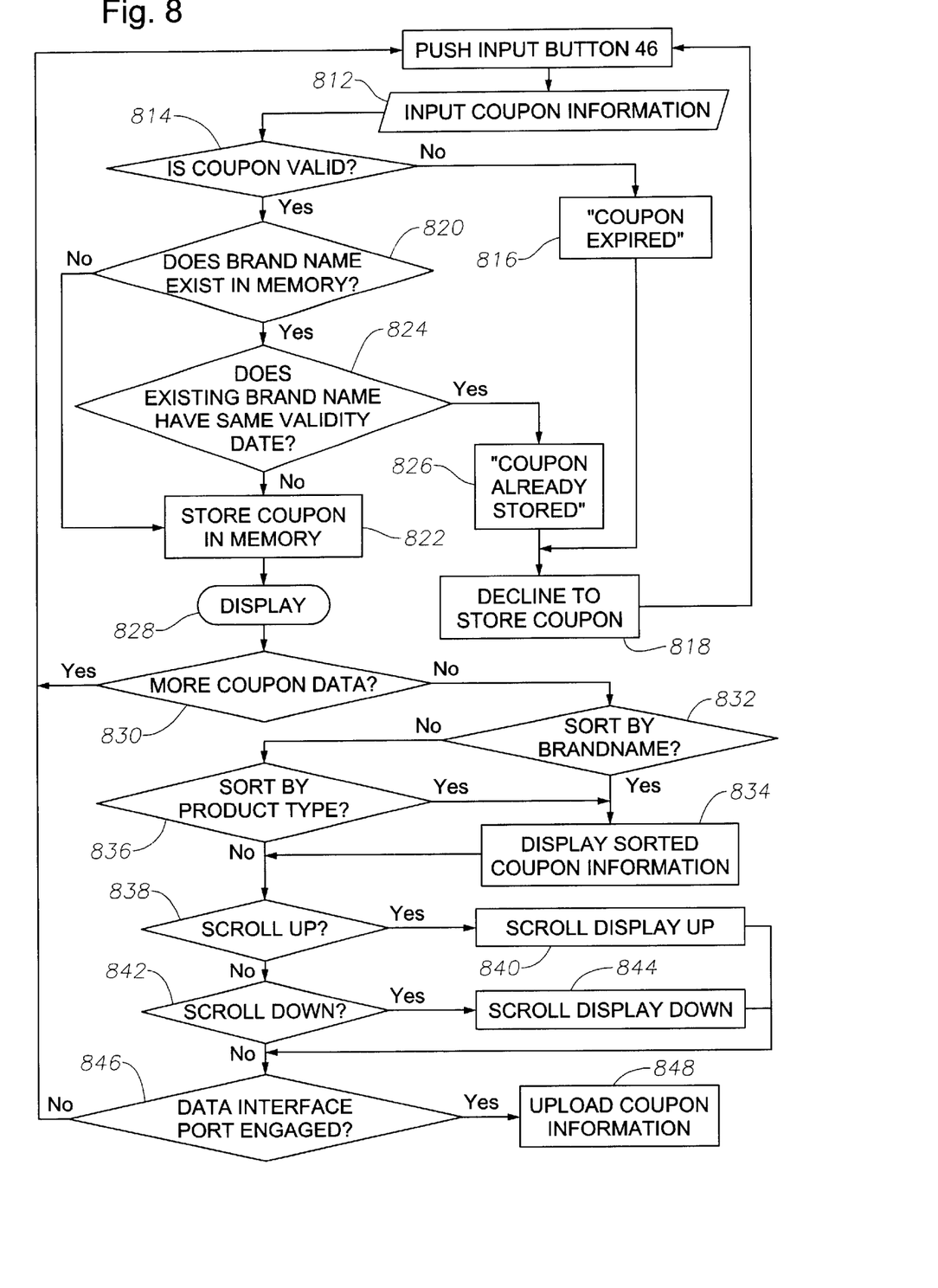
FIG. 8 is a schematic flow diagram representing the basic steps used in operation of the scanning and display device of the coupon management system of the invention.

Referring now to FIG. 8, a control sequence is schematically represented. The scanning and display device 24 receives coupon information via scanner face 38. Preferably, the coupon information is coded by a bar code sequence as is commonly known in the art. The scanned information is then received within the memory of the scanning and display device 24. Insert button 46 is pushed to input the coupon information as is indicated in box 810 in FIG. 8. When input button 46 has been pushed as indicated in decision box 810, then the coupon information is stored in memory of the scanning and display device 24 as indicated in box 812. Preferably, the coupon information includes the brand name of the product, the type of product, the size of product, the value of the coupon and the validity or expiration dates of the coupon.

The scanning and display device 24 then determines whether the coupon is valid as designated in box 814, i.e., it is determined whether the expiration date has passed. If the expiration date has passed, then a message is displayed on display screen 40, indicating that the coupon has expired, as indicated in box 816. The scanning and display device 24 then declines to store the coupon information in memory as indicated in box 818.

If it is determined that the coupon has not expired or is valid as indicated in box 814, then it is determined whether the brand name already exists in memory within the scanning and display device 24, as indicated in box 820. If the brand name is not already in memory, then the coupon information 23 is stored in the memory as indicated in box 822. If it is determined that the brand name already exists in memory as indicated in box 820, then it is determined whether the coupon has the same validity date as a coupon already stored in memory is indicated in box 824. If the coupon information 23 indicates that the coupon 25 has the same validity date as a coupon 25 already stored in memory as indicated in box 824, then a message is displayed on display screen 40, indicating that the coupon 25 has already been stored, as indicated in box 826. If so, then the scanning and display device 24 declines to store the coupon information 23 as indicated in box 818. If the coupon 25 does not have the same validity date, then the coupon information 23 is stored within memory as shown in box 822 and the coupon information 23 is displayed on display screen 40 as indicated in box 828.

At this time, scanning and display device 24 inquires whether additional coupon data 25 exists to be input, as indicated in box 830. If so, input button 40 is depressed as indicated in box 810. If it is determined in box 830 that no more coupon information exists, then the user may elect to sort the stored coupon information by brand name, as indicated in box 832. If so, the coupon information is sorted by brand name and is displayed as indicated in box 834. The user may elect to sort by product type as indicated in box 836, which may be displayed as indicated in box 834. Examples of various product types includes "breads", "meat", "vegetables", "household items", etc.

After selection of the desired display type, the user may then elect to scroll up, as indicated in box 838 and the data is scrolled upwards as indicated in box 840. If it desired to scroll the data downward, as indicated in box 842, the data is then displayed scrolling downwards as indicated in box 844.

A determination is then made whether the data interface port 54 is engaged as indicated in box 846. If not, then the scanning and display device 24 continues to display the stored coupon information 23 as indicated in box 828 or 834 and awaits for input button 46 to be depressed as indicated in box 810. If the data interface port 54 is engaged, then the scanning and display device 24 uploads its memory into a pricing system 12, as indicated in box 848.

Figure 9:
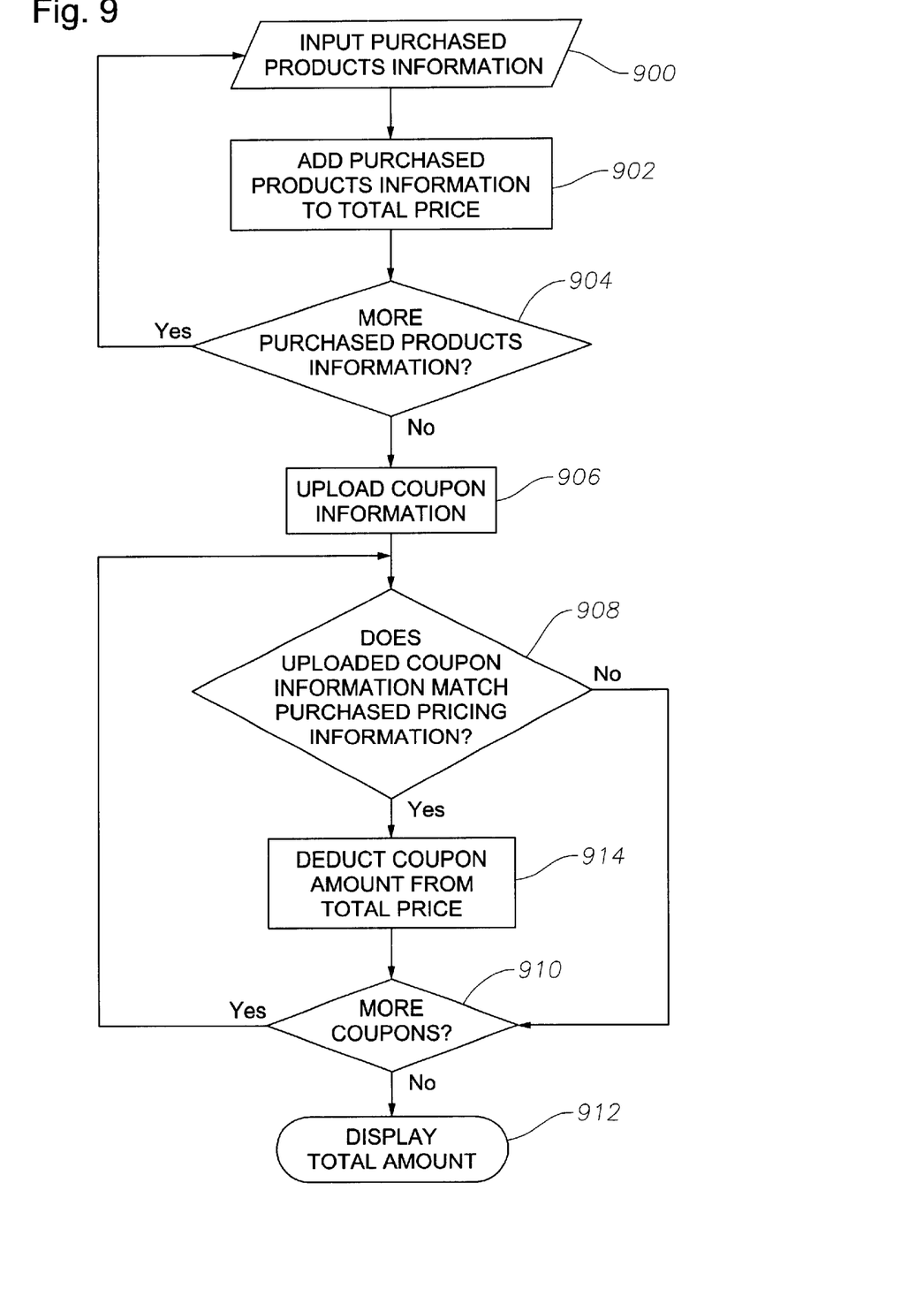
FIG. 9 is a schematic flow diagram representing the steps used by the cashier pricing system of the coupon management system of the invention.

Referring now to FIG. 9, pricing system 12 is designed to operatively engage with the scanning and display device 24 via docking station 22 (FIGS. 1, 6 and 7). Pricing information 15 for purchased products is input by the pricing system, as indicated in box 900. Scannable pricing information 15 for products 18 is preferably input by passing scannable information 15 in front of scanner 16 (FIG. 1). Scanner 16 is preferably of a type that can read bar coded information, as is known in the art. Pricing information 15 preferably includes the brand name of the product, the type of product, and the size of the product. As indicated in box 902, the pricing information 15 of each scanned product 18 is summed so that a running total of the total purchase price may be calculated. It is then determined whether all purchased product information has been input into the pricing system 12, as indicated in box 904. If not, then additional pricing information is input as indicated in box 900. If all purchased product information has been input as indicated in box 904, then the coupon information stored in memory of the scanning and display device 24 is uploaded through docking station 22 (FIGS. 1, 6 and 7) as indicated in box 906. A determination is then made whether the coupon information for a particular coupon 25 matches any purchased pricing information 15 that was input (box 900) as indicated in box 908. If the coupon information does not match the pricing information as determined in box 908, e.g. if coupon information 23 indicating a certain brand name and product size does not match pricing information 15 for a purchased product 18 of the same brand name and size, then it is determined whether there is any additional coupon information 23 for other scanned coupons 25 as indicated in box 910. If not, then the total amount of the pricing information determined in box 902 is displayed, as indicated in box 912.

If it is determined in box 910 that there is additional coupon information that has not been considered, then it is determined whether the additional coupon information matches any purchased pricing information, as indicated in box 908. If coupon information 23 does match the pricing information 15 as indicated in box 908, then the amount of the coupon 25 is deducted from the total price, as indicated in box 914. If it is determined that no more coupon information remains to be considered, then the total amount of the purchase price is displayed, as indicated in box 912.

The coupon management system 10 may be utilized in operation as follows. An operator locates a coupon 25, having scannable coupon information 23 thereon, such as a bar code. The scannable coupon information preferably indicates a brand name, a type of product, a size applicable to the product, a coupon value or amount of discount and the validity or expiration dates associated with the coupon 25. The operator then depresses the insert button 46 and runs the scanner face 38 of the scanning and display device 24 over the scannable coupon information 23. Scanning and display device 24 then determines whether the coupon 23 is valid by comparing the expiration date of the coupon 23 with the current date. If the coupon 23 is determined to be invalid, then the scanning and display device 24 declines to store the coupon information 25. If the coupon is determined to be valid, the scannable coupon information 23 is displayed via display screen 40. Additionally, if scanning and display device 24 determines that stored coupon 25 is no longer valid, then the coupon information 23 is deleted from memory.

The scanning and display device 24 then determines whether the scannable coupon information 23 for the coupon 25 already exists within memory of the scanning and display device 24. If so, it is determined whether the stored coupon has the same or later validity dates or expiration date for the scanned coupon 25. If so, the scanning and display device 24 declines to store the scannable coupon information 23 in memory and indicates on display screen 40 that the coupon is already stored within the device. If the scannable coupon information 23 of coupon 25 is not stored within the memory of the scanning and display device 24, then the scannable coupon information 23 is stored within memory in scanning and display device 24.

The scannable coupon information 23 for various coupons 25 may then be categorized by desired attributes. Examples of such attributes include a brand name of the product or by the type of product. Examples of types of products includes breads, produce, meats, vegetables, household items, etc. Relevant information is then displayed via display screen 40. Relevant information preferably includes the brand name, coupon value and expiration date of the coupon.

Once all desired coupons 25 have been scanned into the scanning and display device 24, an operator may then transport the scanning and display device 24 to a store. An operator may then select products 18, such as groceries, and place the products 18 in a shopping cart. The operator then wheels the shopping cart to a checkout register, where a checkout person operates a pricing system or computerized cash register 12. The pricing system 12 includes a scanner 16.

As the cash register operator scans in the prices of products 18, the pricing system 12 obtains the brand name of the product, the type of the product, the size of the product and the price of the product from the scannable pricing information 15. This information 15 is stored within the computing device 14 of the pricing system 12. The computing device 14 adds the pricing information from each of the products 18 to calculate a total price. At this time, the operator or shopper may insert the scanning and display device 24 into a docking station 22 (FIGS. 1, 6 and 7). The stored coupon information 23 in the memory of the scanning and display device 24 is then uploaded into the pricing system 12 at the grocery store. Computing device 14 then compares the scannable coupon information 23 associated with each coupon 25 stored within the memory of the scanning and display device 24 that was scanned off of individual products 18 with the scanner 16 and input into the computing device 14 of the pricing system 12. If it is determined that scannable coupon information stored within the scanning and display device 24 matches with a purchased product 18, i.e., the operator or purchaser has an electronic coupon for the selected product 18, then the computing device 14 reduces the total price of the purchased items 18 by the value of the stored coupon, which is available from the stored scannable coupon information 25. Once an electronic coupon has been matched with a product, the coupon is deleted from the memory within the scanning and display device 24.

The coupon management system has numerous advantages. These advantages include eliminating the hassles of clipping and transporting coupons to a store. The reduction of hassle will result in increased use by consumers, which is desirable for manufacturers of products, since consumers are more likely to be influenced by the easier to use coupons. Additional advantages include a reduction in store labor, since the coupons do not have to be manually entered into the cash register or pricing system. The result of the automated coupon matching and price reduction is a decrease in checkout time for consumers.

While the invention has been shown in only one of its forms, it should be apparent to those skilled in the art that it is not so limited, but is susceptible to various changes without departing from the scope of the invention.

What is claimed is:

1. A method of crediting coupons to a consumer comprising the steps of:

locating a coupon having scannable coupon information;

scanning said scannable coupon information with a device having a memory, a display screen, and a bar-code algorithm;

determining whether said scannable coupon information for said coupon already exists in said memory for validity dates and if so declining to store said scannable coupon information in said memory and indicating that said coupon is already stored within said device; if not, then storing said scannable coupon information in a memory of said device;

attaching a unique customer identifier for the consumer to said scannable coupon information;

connecting said device to a cradle and obtaining a connection with a coupon database;

uploading said scannable coupon information and the unique customer identifier into the coupon database;

comparing said scannable coupon information with coupon information in said coupon database and the unique customer identifier with previously stored customer data to determine if a valid user is accessing the coupon database and if not, terminating the connection; if so, then obtaining said coupon information in said coupon database relating to said scannable coupon information;

downloading and storing said coupon information with a validation code from said coupon database into the memory within said device;

organizing said coupon information;

displaying coupon information on said display screen of said device;

transporting said device to a store;

scanning scannable pricing information provided on products for purchase with a pricing system in said store;

storing said pricing information in a memory of said pricing system;

adding said pricing information from each of said products to calculate a total price;

inserting said device in a second cradle and making a second connection with the pricing system;

uploading said scannable coupon information and the validation code into said pricing system at said store;

comparing said scannable coupon information with said scannable pricing information and the validation code with a corresponding validation code provided by a manufacturer; reducing a total price of said products by said coupon value represented by said scannable coupon information if the validation code matches the corresponding validation code;

deleting said scannable coupon information from said memory of said device when said scannable coupon information corresponding to a particular coupon is matched with said scannable pricing information and the validation code matches the corresponding validation code; and completing a purchase transaction for the products.

2. The method of claim 1 wherein displaying coupon information is performed by displaying a brand name, a type of product, a size applicable to the product, a coupon value, an expiration date, an advertising code, and combinations thereof.

3. The method of claim 1 wherein organizing said coupon information is performed by categorizing the coupon information by a brand name, a type of product, and combinations thereof.

4. The method of claim 1 wherein scanning said scannable coupon information is performed by manually entering a UPC number into the device.

5. The method of claim 1 wherein scanning said scannable coupon information is performed by downloading the scannable coupon information directly from the coupon database during the downloading and storing said coupon information with a validation code step.

6. The method of claim 1 wherein scanning said scannable coupon information is performed by scanning a bar code on a product and obtaining the scannable coupon information from the coupon database.

7. The method of claim 1 further including updating the unique customer identifier and the stored customer data and with current personal information about the consumer.

8. The method of claim 1 wherein the first cradle and the second cradle are selected from a group consisting of a docking station, a serial bi-directional data port, an infrared transceiver device, a magnetic disk writing device, a laser transmit-receive interface, and a wireless device.

9. The method of claim 1 wherein the locating a coupon having scannable coupon information is performed by utilizing a coupon that is selected from the group consisting of a coupon, a rebate, and a raincheck.

10. The method of claim 1 further comprising calculating a cumulative coupon savings for the consumer by adding the coupon value for each purchase transaction during a defined interval.

11. The method of claim 10 where the defined interval is selected from the group consisting of a present shopping trip, a month to date, and a year to date.

12. A device for storing and uploading coupon information comprising:
   a housing having a guide slot for connecting with a cradle;
   a battery in said housing;
   a charger port on a side of said housing to receive a power input for charging said battery;
   a scanner device for reading scannable information off of paper;
   a microprocessor;
   an audio signal device;
   a random access memory;
   a read only memory containing operating routines;
   a display screen for displaying coupon information;
   an insert button to store selected scanned information in a memory of said device;
   a delete button to delete selected store information from said memory of said device;
   a top of said device having a scanner face;
   a bottom of said device having a data interface port;
   a scan button to scan scannable information;
   wherein said operating routines comprise a bar code algorithm;
   a comparison routine for determining whether said scannable coupon information for said coupon already exists in said memory for validity dates and if so declining to store said scannable coupon information in said memory and indicating that said coupon is already stored within said device, if not, then storing the scannable coupons information;
   a second comparison routine for comparison said scannable information with coupon information in a coupon database and a unique customer identifier with previously stored customer data to determine if a valid user is accessing the coupon database and if not, terminating the access connection; if so, then completing a data gathering routine for obtaining said coupon information in said coupon database relating to said scannable coupon information;
   a downloading routine for downloading and storing said coupon information with a validation code from said coupon database into the memory within said device;
   a sorting routine for organizing said coupon information; and
   any combination thereof.

13. The device of claim 12 further including a manual coupon entry mechanism wherein the manual coupon entry mechanism is selected from the group consisting of a keypad, a phone line, and a cradle.

14. The device of 12 wherein the scanner device comprises an optical scanner.

15. The device of 12 wherein the scanner device comprises a laser scanner.

16. The device of 12 Wherein the display screen is selected from the group consisting of a LCD screen, an active matrix screen, a passive matrix screen, and a gas plasma display panel.

17. The device of 12 further comprising a voice chip to convert written information into verbal information.

18. A system for crediting coupons to a consumer comprising:
   a coupon having scannable coupon information;
   a device having a memory, a display screen; and a bar-code algorithm for scanning said scannable coupon information;
   a comparison routine within the memory of the device for determining whether said scannable coupon information for said coupon already exists in said memory for validity dates and if so declining to store said scannable coupon information in said memory and indicating that said coupon is already stored within said device; if not, then
   a memory of said device for storing said scannable coupon information;
   a unique customer identifier to attach customer data to said scannable coupon information;
   a cradle for connecting to said device wherein the cradle has a modem for obtaining a connection with a coupon database and uploading said scannable coupon information and the unique customer identifier into the coupon database;
   a second comparison routine within the memory of the device for comparing said scannable coupon information with coupon information in said coupon database and the unique customer identifier with previously stored customer data to determine if a valid user is accessing the coupon database and if not, terminating the connection; if so, then
   a data gathering routine within the memory of the device for obtaining said coupon information in said coupon database relating to said scannable coupon information;
   a downloading routine within the memory of the device for downloading and storing said coupon information with a validation code attached to the validation code from said coupon database into the memory within said device;
   a sorting routine within the memory of the device for organizing said coupon information;
   a store for transporting the device to;
   a pricing system within the store for scanning scannable pricing information provided on products for purchase wherein the pricing system includes a memory for storing said pricing information;
   a calculating routine within the pricing system for adding said pricing information from each of said products to calculate a total price;
   a second cradle for connecting to the device and making a second connection with the pricing system;
   an uploading routine within the pricing system for uploading said scannable coupon information and the validation code into said pricing system at said store;

a comparison routine within the pricing system for comparing said scannable coupon information with said scannable pricing information and the validation code with a corresponding validation code provided by a manufacturer and reducing a total price of said items by said coupon value represented by said scannable coupon information if the validation code matches the corresponding validation code; and a deleting routine within the pricing system for deleting said scannable coupon information from said memory of said device when said scannable coupon information corresponding to a particular coupon is matched with said scannable pricing information and the validation code matches the corresponding validation code.

19. The system of claim 18 further including:

a store server for storing redemption information wherein the redemption information is determined by adding amounts reduced as a result of the comparison routine;

a connection between the pricing system and the store server; and an information accumulator for uploading redemption information wherein the information accumulator includes a computer system comprising a database, a backup system, a central processing unit, and a modem for establishing a second connection between the clearinghouse and the store server; and a report generating routine to determine redemption amounts a manufacturer owes a supermarket chain.

20. The system of 18 wherein the information accumulator is selected from the group consisting of a clearinghouse, a home office of the store, and the Internet.

21. The system of 18 wherein the coupon is selected from a group consisting of a coupon, a rebate, and a raincheck.

22. The system of 18 wherein the first cradle and the second cradle are selected from a group consisting of a docking station, a serial bi-directional data port, an infrared transceiver device, a magnetic disk writing device, a laser transmit-receive interface, and a wireless device.

* * * * *